US009323254B2

(12) United States Patent
Furutani et al.

(10) Patent No.: US 9,323,254 B2
(45) Date of Patent: Apr. 26, 2016

(54) MOTOR CONTROL APPARATUS

(75) Inventors: Shinichi Furutani, Chiyoda-ku (JP);
Kazuaki Ando, Chiyoda-ku (JP); Akira Tanabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 14/368,688

(22) PCT Filed: Jan. 16, 2012

(86) PCT No.: PCT/JP2012/050751
§ 371 (c)(1),
(2), (4) Date: Jun. 25, 2014

(87) PCT Pub. No.: WO2013/108356
PCT Pub. Date: Jul. 25, 2013

(65) Prior Publication Data
US 2015/0137727 A1 May 21, 2015

(51) Int. Cl.
*G05B 9/02* (2006.01)
*G05D 17/02* (2006.01)
*H02P 21/00* (2006.01)
*G05D 3/12* (2006.01)
*H02P 27/06* (2006.01)

(52) U.S. Cl.
CPC ............. *G05D 17/02* (2013.01); *G05D 3/12* (2013.01); *H02P 21/0089* (2013.01); *H02P 27/06* (2013.01)

(58) Field of Classification Search
USPC ......... 318/566, 560, 127, 400.14, 400.15, 48, 318/431, 58
See application file for complete search history.

(56) References Cited

U.S. PATENT DOCUMENTS

| 2013/0026959 A1* | 1/2013 | Sonoda | H02P 29/028 318/400.15 |
| 2013/0234643 A1* | 9/2013 | Shibata | H02P 23/0004 318/639 |
| 2013/0307447 A1* | 11/2013 | Rozman | G05B 11/01 318/400.02 |

FOREIGN PATENT DOCUMENTS

JP 08-336290 A 12/1996
JP 2000-013914 A 1/2000
(Continued)

OTHER PUBLICATIONS

Examination Report of Taiwan Patent Application No. 101116634 dated Mar. 10, 2014.
(Continued)

*Primary Examiner* — Bentsu Ro
*Assistant Examiner* — Iftekhar Mustafa
(74) *Attorney, Agent, or Firm* — Sughrue Mion, PLLC; Richard C. Turner

(57) ABSTRACT

A motor control apparatus includes a torque-limit output unit configured to output a torque limit with which power consumption of a motor is equal to or smaller than a predetermined motor power limit value and voltage amplitude required for driving the motor is equal to or smaller than a predetermined voltage limit, a position-command generating unit configured to generate a position command to a reference position according to the torque limit value, and a power/voltage limiting unit configured to perform processing for correcting a motor torque current on the basis of an excess of the motor power consumption with respect to a motor power consumption limit value and processing for correcting a motor excitation current on the basis of an excess of a motor torque divided voltage with respect to a motor torque divided voltage limit value.

12 Claims, 6 Drawing Sheets

(56) References Cited

FOREIGN PATENT DOCUMENTS

| JP | 2001-238490 A | 8/2001 |
| JP | 2002-064991 A | 2/2002 |
| JP | 2002-272153 A | 9/2002 |
| JP | 2005-057894 A | 3/2005 |

OTHER PUBLICATIONS

International Search Report of PCT/JP2012/050751 dated Apr. 17, 2012.

Communication dated Oct. 14, 2015 from the Korean Intellectual Property Office in counterpart application No. 10-2014-7019325.

* cited by examiner

MOTOR CONTROL APPARATUS

CROSS REFERENCE TO RELATED APPLICATIONS

This is a National Stage of International Application No. PCT/JP2012/050751 filed Jan. 16, 2012, the content of all of which is incorporated herein by reference in its entirety.

FIELD

The present invention relates to a motor control apparatus that controls a motor via an inverter.

BACKGROUND

A motor control apparatus generates a control signal for causing a switching element included in an inverter to perform an ON/OFF operation. The switching element performs the ON/OFF operation according to the control signal output from the motor control apparatus, whereby the inverter converts output power of a direct-current power supply into alternating-current power and supplies the alternating-current power to a motor. Consequently, the motor is controlled to have desired values as the position and the speed or the torque thereof. As this type of the motor, an induction motor, a permanent magnet synchronous motor, or the like is used.

As examples of the direct-current power supply of the inverter, there are, for example, a diode converter that rectifies electric power output from a three-phase alternating-current power supply and outputs the rectified electric power and a DC/DC converter that subjects electric power output from a battery or a capacitor to voltage level conversion and outputs the electric power.

This kind of the direct-current power supply generally has upper limits in electric power and a voltage that the direct-current power supply can output. The direct-current power supply needs to be used within ranges of the upper limits. For example, an upper limit of electric power that the battery or the capacitor can output depends on the life, accumulated energy, and the like of the battery or the capacitor. In the DC/DC converter or the diode converter, specifications of a voltage value, a current value, and the like that can the DC/DC converter or the diode converter can handle are equivalent to the upper limit of the electric power. Further, in the diode converter, there is a power supply facility capacity of a three-phase alternating-current power supply as another limiting factor. Therefore, electric power that the inverter can output is also limited. As the limitation, although there is a limitation due to the specifications of the inverter itself, there is a limitation that alternating-current power to be output should be set to be equal to or smaller than output power of the direct-current power supply.

The inverter supplies the direct-current voltage of the direct-current power supply to the motor via an ON/OFF operation of a semiconductor switching element. Therefore, a voltage exceeding the direct-current voltage output from the direct-current power supply cannot be supplied to the motor. Therefore, like the electric power explained above, a voltage that the inverter can output is also limited. Because of the reasons explained above, the motor control apparatus needs to control the motor within limitation ranges of the electric power and the voltage that depend on the direct-current power supply and the inverter specifications.

To solve the problems, for example, Patent Literature 1 discloses a technology for generating, taking into account operation timing of a motor and supply power of a power supply in advance, a position command that assumes limitations on acceleration (torque) and motor speed of the motor. When this technology is used, it is possible to suppress electric power necessary for acceleration and deceleration of the motor to be within a predetermined range.

CITATION LIST

Patent Literature

Patent Literature 1: Japanese Patent Application Laid-Open No. 2002-272153

SUMMARY

Technical Problem

However, the technology disclosed in Patent Literature 1 does not take into account a loss of the motor when electric power consumed by the motor is taken into account. Therefore, for example, when the technology is applied to a motor having a large loss, electric power that the direct-current power supply should supply is likely to exceed an upper limit of electric power that can be output.

The technology disclosed in Patent Literature 1 does not take into account a voltage required for motor driving. Therefore, for example, an induced voltage is likely to be generated during motor high-speed operation, exceed a voltage that the inverter can supply, and cause voltage saturation.

When the electric power and voltage shortage occurs, it is likely that a torque shortage occurs, which causes accuracy deterioration and instability of position control or speed control. When a small electric current is applied as a measure for avoiding voltage saturation, a copper loss increases due to the small electric current. Therefore, the limitations on the electric power and the voltage sometimes cannot be simultaneously satisfied.

The present invention has been made in view of the above, and it is an object of the present invention to obtain a motor control apparatus that can suppress power consumption of a motor and a voltage required for driving the motor to be within predetermined ranges.

Solution to Problem

The present invention is directed to a motor control apparatus that achieves the object. The motor control apparatus includes a position-command generating unit configured to output a position command for causing a rotor position of a motor to follow a reference position; a position control unit configured to perform control such that the rotor position of the motor and the position command coincide with each other and output a motor rotor speed command; and a torque-limit output unit configured to output a torque limit value that is an allowable torque of the motor. According to rotor speed of the motor, the torque-limit output unit outputs the torque limit value with which power consumption required for driving of the motor is equal to or smaller than a predetermined motor power limit value and voltage amplitude required for the driving of the motor is equal to or smaller than a predetermined voltage limit. The position-command generating unit generates the position command according to the torque limit value.

Advantageous Effects of Invention

According to the present invention, there is an effect that it is possible to suppress power consumption of a motor and a voltage required for driving the motor to be within predetermined ranges.

DESCRIPTION OF EMBODIMENTS

Embodiments of a motor control apparatus according to the present invention are explained in detail below with reference to the drawings. Note that the present invention is not limited by the embodiments.

First Embodiment

Figure 1:
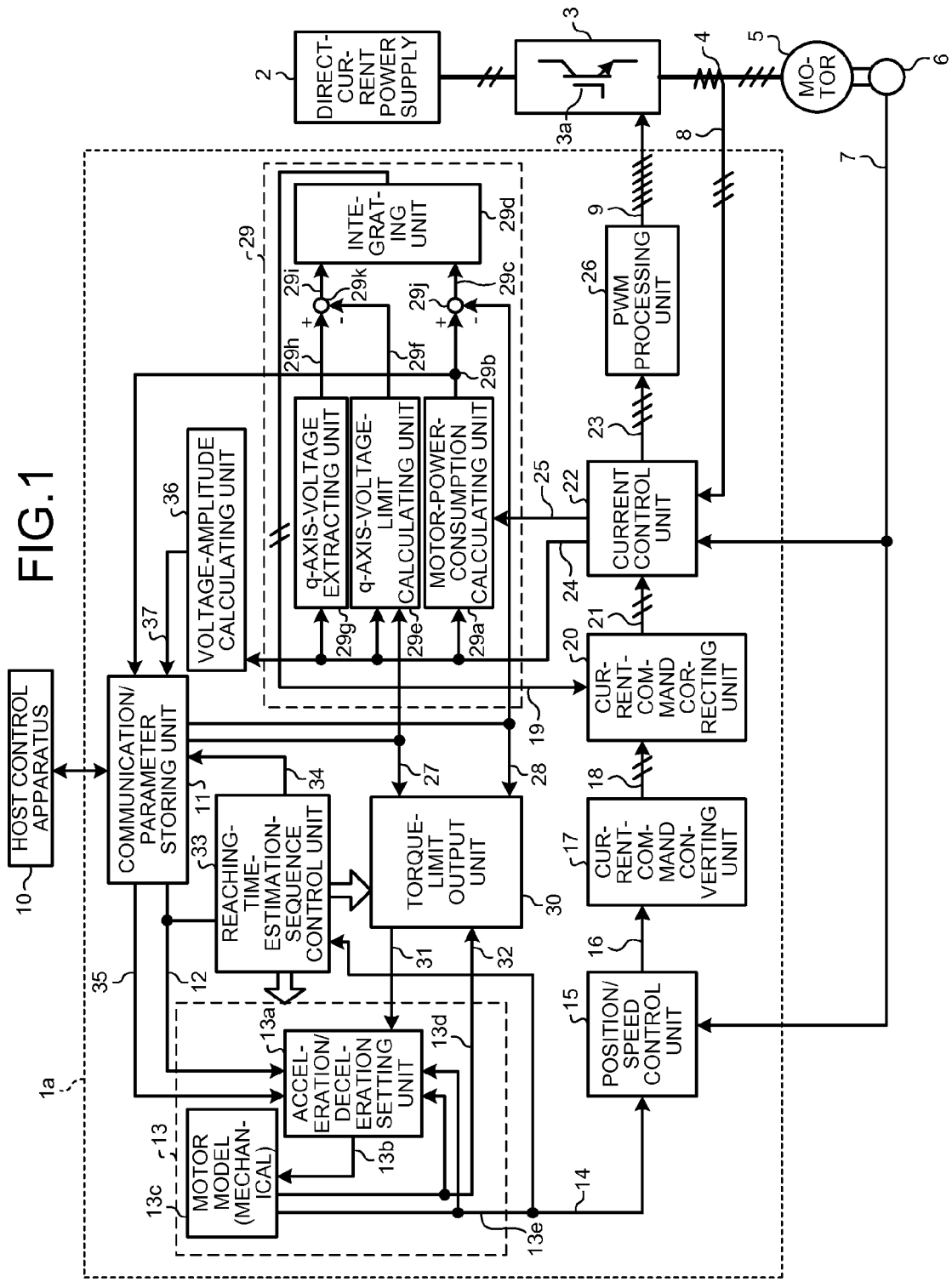
FIG. 1 is a block diagram of the configuration of a motor control apparatus according to a first embodiment of the present invention.

FIG. 1 is a block diagram of the configuration of a motor control apparatus according to a first embodiment of the present invention. A motor control apparatus 1a according to the first embodiment includes a position control configuration for controlling a rotor position of a motor 5 to a reference position while suppressing power consumption of the motor 5 and a voltage for driving of the motor 5 to values equal to or smaller than predetermined values, respectively.

In FIG. 1, a switching element 3a performs ON/OFF operation according to a switching command 9 output from the motor control apparatus 1a according to the first embodiment, by which an inverter 3 converts output power of a direct-current power supply 2 into alternating-current power and supplies the alternating-current power to the motor 5. A detected motor current 8 detected by a current detector 4 attached to a power supply cable between the inverter 3 and the motor 5 is input to the motor control apparatus 1a as a feedback signal. A detected motor position 7 detected by a position detector 6 attached to the motor 5 is input to the motor control apparatus 1a as a feedback signal.

In the first embodiment, the motor 5 is a magnet embedded synchronous motor (IPM). Driving control for the IPM is performed by a system for dividing, on a two-axis orthogonal rotating coordinate including a d axis coinciding with the direction of a magnetic flux vector generated by a permanent magnet of an IPM rotor and a q axis orthogonal to the d axis, a motor current of the motor 5 into a current component on the d axis (an excitation current component) and a current component on the q axis (a torque current component) and handling the motor current.

A circuit equation on a dq-axis coordinate used in the driving control for the IPM is represented by Formula (1). Note that, in Formula (1), Vd represents d-axis voltage, Vq represents q-axis voltage, R represents winding resistance, Ld represents d-axis inductance component, Lq represents q-axis inductance component, Φ represents induced voltage constant, $\omega_{re}$ represents electrical angle frequency (obtained by multiplying motor rotating speed with the number of pole pairs), p represents the number of pole pairs, Id represents excitation (small) current, and Iq represents torque current.

$$\begin{bmatrix} V_d \\ V_q \end{bmatrix} = \begin{bmatrix} R + pL_d & -\omega_{re} \cdot L_q \\ \omega_{re} \cdot L_q & R + pL_d \end{bmatrix} \begin{bmatrix} I_d \\ I_q \end{bmatrix} + \begin{bmatrix} 0 \\ \omega_{re} \cdot \Phi \end{bmatrix} \quad (1)$$

In FIG. 1, a host control apparatus 10 is shown. The motor control apparatus 1a according to the first embodiment includes a communication/parameter storing unit 11 as an interface with the host control apparatus 10. The host control apparatus 10 and the communication/parameter storing unit 11 transmit and receive information concerning the motor 5, the direct-current power supply 2, the inverter 3, a power limit value 28, and a voltage limit value 27 and other information. Note that the power limit value 28 is an upper limit value of power consumption of the motor 5. The voltage limit value 27 is an upper limit value of a voltage required for driving the motor 5. The host control apparatus 10 determines the power limit value 28 and the voltage limit value 27 on the basis of a power supply capacity and an output voltage of the direct-current power supply 2, and transmits the power limit value 28 and the voltage limit value 27 to the motor control apparatus 1a. That is, upper limits of the motor power consumption and the voltage required for the motor driving can be set in the motor control apparatus 1a according to a command of the host control apparatus 10. The upper limits of the motor power consumption and the voltage required for the motor driving can be set according to an ambient environment and operation conditions.

First, the host control apparatus 10 and the communication/parameter storing unit 11 are explained. The host control apparatus 10 sets driving conditions taking into account not only the power supply capacity and the output voltage of the direct-current power supply 2 but also an environment around the motor 5 such as electric power, an operation time, and the like of an entire system including the motor 5, the inverter 3, and the motor control apparatus 1a. Therefore, the motor control apparatus 1a needs to drive the motor 5 according to the setting by the host control apparatus 10. Consequently, the communication/parameter storing unit 11 is provided in the motor control apparatus 1a to make it possible to attain the driving of the motor 5.

In a form shown in FIG. 1, one motor 5 and one inverter 3 are connected. However, besides, there is known a system in which a plurality of motors and a plurality of inverters are connected to the direct-current power supply 2 and the host control apparatus 10 collectively controls the motors and the inverters. In this system, the host control apparatus 10 calculates electric powers and voltages supplied to the respective motors and the respective inverters taking into account priority levels of the operations and an associated operation (timing) of the motors and the inverters and causes the motors and the inverters to operate. In the system in which the motors and the inverters are connected to the direct-current power supply, the communication/parameter storing unit 11 is an essential element in the motor control apparatus 1a.

In the conventional system in which the motors and the inverters are connected to the direct-current power supply, a capacity of the direct-current power supply is often selected as a value obtained by simply adding up maximum electric powers for use set as specifications of the respective motors and the respective inverters. However, in actual operation, the motors and the inverters hardly operate at such maximum electric powers for use. Therefore, the direct-current power supply with the capacity more than necessary is selected with respect to actual operation conditions, which causes an increase in costs. Concerning this problem, according to the first embodiment, as explained below, it is possible to reduce costs because the selection of the direct-current power supply 2 can be appropriately carried out.

As a specific example of the system in which the motors and the inverters are connected to the direct-current power supply, there is a motor control system used for a machine tool. In the case of the motor control system, a plurality of motors and a plurality of inverters are used to move a work piece (a work) with two servomotors for feeding and perform work cutting with a spindle motor.

In that case, in general, power consumption of the spindle motor is often relatively large. Therefore, conventionally, when the spindle motor operates while the servomotors for feeding are performing a positioning operation, an output voltage of the direct-current power supply greatly fluctuates. In the servomotors for feeding, in some case, torque cannot be output because of a voltage shortage, and the operation of the servomotor for feeding is disturbed.

To solve this problem, according to the first embodiment, as will be explained later, the host control apparatus 10 can transmit a voltage limit value to a motor control apparatus for the servomotor for feeding, by anticipating output voltage fluctuation of the direct-current power supply 2 in advance. Therefore, it is possible to cause the servomotor for feeding to operate, by avoiding a voltage shortage. Conversely, for example, when the spindle motor starts to operate while the servomotor for feeding is carrying out positioning control, it is possible to limit a power limit value and a voltage limit value to make it possible to secure electric power for the servomotor for feeding.

The communication/parameter storing unit 11 is explained. The communication/parameter storing unit 11 performs operations such as transmission and reception of information to and from the host control apparatus 10 and retention of parameters. When the power limit value 28 and the voltage limit value 27 necessary for the operation of an electric power/voltage limiting unit 29 and a torque-limit output unit 30 are sent from the host control apparatus 10, the communication/parameter storing unit 11 stores the power limit value 28 and the voltage limit value 27 as control parameters of the motor control apparatus 1a and outputs those values 28 and 27 according to necessity of the electric power/voltage limiting unit 29 and the torque-limit output unit 30. When a reference position 12 necessary for the operation of a position-command generating unit 13 and a reaching-time-estimation-sequence control unit 33 is sent from the host control apparatus 10, the communication/parameter storing unit 11 stores the reference position 12 as a control parameter of the motor control apparatus 1a and outputs the reference position 12 according to necessity of the position-command generating unit 13 and the reaching-time-estimation-sequence control unit 33. When a position control time maximum speed 35 necessary for the operation of the position-command generating unit 13 is sent from the host control apparatus 10, the communication/parameter storing unit 11 stores the position control time maximum speed 35 as a control parameter of the motor control apparatus 1a and outputs the position control time maximum speed 35 according to necessity of the position-command generating unit 13.

In the communication/parameter storing unit 11, timing for storing the control parameters of the motor control apparatus 1a is timing before shipment of the motor control apparatus 1a, timing when the motor control apparatus 1a is started, timing when an update notification for a value is received from the host control apparatus 10, or the like. Because the power limit value 28 and the voltage limit value 27 can be changed and retained as the control parameters in the communication/parameter storing unit 11, it is possible to attain motor driving under appropriate power/voltage conditions at every moment. For example, the power limit value 28 and the voltage limit value 27, which correspond to a three-phase alternating-current power supply facility capacity of a building in which the direct-current power supply 2 is set and a power supply capacity and a voltage level allocated to the apparatus, can be set. Therefore, it is possible to easily realize introduction of the apparatus without increasing the power supply facility capacity.

Further, the communication/parameter storing unit 11 transmits power consumption 29b of the motor 5 calculated by a motor-power-consumption calculating unit 29a in the electric power/voltage limiting unit 29, a voltage 37 required for motor driving calculated by a voltage-amplitude calculating unit 36, and an estimated reaching time 34 output by the reaching-time-estimation-sequence control unit 33 to the host control apparatus 10.

The voltage-amplitude calculating unit 36 applies a dq-axis voltage command 24 output by the current control unit 22 to Formula (2) to calculate the voltage 37 required for the motor driving. Note that, in Formula (2), Vn represents the voltage 37 required for the motor driving, Vd* represents d-axis voltage command, and Vq* represents q-axis voltage command.

$$V_n = \sqrt{V_d^{*2} + V_q^{*2}} \qquad (2)$$

The host control apparatus 10 can perform learning on the basis of these kinds of information and set the power limit value 28 and the voltage limit value 27 that give more appropriate operation conditions. When the motor 5 is accelerated from zero speed, near low motor speed, power consumption of the motor and a voltage required for driving of the motor 5 have margins with respect to the power limit value 28 and the voltage limit value 27. By grasping the power consumption 29b and the voltage required for the driving, the host control apparatus 10 can cause other inverters and motors connected to the direct-current power supply 2 to operate using the margins.

An inverter driving system "a position/speed control unit 15, a current-command converting unit 17, a current-command correcting unit 20, a current control unit 22, and a PWM processing unit 26" is explained that subjects the switching element 3a of the inverter 3 to ON/OFF control according to a position command 14 generated by the position-command generating unit 13 as explained below.

The position/speed control unit 15 carries out position control and speed control in this order on the basis of the position command 14 output from the position-command generating unit 13 and the detected motor position 7 output from the position detector 6, generates a torque command 16, and outputs the torque command 16 to the current-command converting unit 17. In general, the position control is carried out by P control and the speed control is carried out by PI control such that control deviations of the controls are zero. Moreover, feed forward control (FF control) employing an ideal operation model of a motor position is often used together.

The current-command converting unit 17 converts the torque command 16 into a dq-axis current command 18 and outputs the dq-axis current command 18 to the current-command correcting unit 20. For the configuration of the current-command converting unit 17, various configuration methods are examined according to types and application fields of the motor 5. For example, a q-axis current command is calculated by dividing the torque command 16 by a torque constant. A d-axis current command is simply set to zero. In some case, a magnetic-flux control unit is provided in higher order, and a control output of the magnetic-flux control unit is allocated. Alternatively, in some case, the d-axis current command and the q-axis current command are calculated as a set according to a map for referring to operation conditions created in advance.

The current-command correcting unit 20 corrects the dq-axis current command 18 on the basis of a dq-axis current correction signal 19 output by an integrating unit 29d in the electric power/voltage limiting unit 29, and outputs the dq-axis current command 18 to the current control unit 22 as a dq-axis current command 21. Details concerning the current-command correcting unit 20 are explained below.

The current control unit 22 generates a voltage command 23 on the basis of the dq-axis current command 21 corrected by the current-command correcting unit 20, the detected motor current 8 output from the current detector 4, and the detected motor position 7 output from the position detector 6. The current control unit 22 carries out the PI control and non-interference control for compensating for electromagnetic interference between p and q axes on a dq-axis coordinate such that a control deviation of the respective dq-axis currents is zero. The current control unit 22 converts the dq-axis voltage command 24 obtained in a processing process of the control into the voltage command 23 on a stationary coordinate. An electrical angle used for coordinate conversion processing is converted from the detected motor position 7. The dq-axis voltage command 24 is output to the motor-power-consumption calculating unit 29a, a q-axis-voltage-limit calculating unit 29e, and a q-axis-voltage extracting unit 29g in the electric power/voltage limiting unit 29 and the voltage-amplitude calculating unit 36. The current control unit 22 subjects the detected motor current 8 to coordinate conversion and calculates a dq-axis current 25. The dq-axis current 25 is output to the motor-power-consumption calculating unit 29a in the electric power/voltage limiting unit 29.

The voltage command 23 generated by the current control unit 22 is converted into the switching command 9 by the PWM processing unit 26 according to carrier comparison. Consequently, the switching element 3a of the inverter 3 is subjected to ON/OFF control, and alternating-current power is supplied to the motor 5. The position of the motor 5 is controlled by repeating the processing explained above.

In the configuration of the inverter driving system that subjects the switching element 3a of the inverter 3 to ON/OFF control according to the position command 14 generated by the position-command generating unit 13 explained above, a configuration excluding the current-command correcting unit 20 configured to perform correction of a current command is a general configuration.

The configuration and operation of the electric power/voltage limiting unit 29 are explained in detail. A function of the electric power/voltage limiting unit 29 is to limit, in the driving of the motor 5, motor power consumption of the motor 5 to a value equal to or smaller than a power limit value and limit a voltage required for the driving to a value equal to or smaller than a voltage limit value. The function is realized by generating the dq-axis current correction signal 19 used for correction of the dq-axis current command 18 according to motor power consumption suppression processing and motor driving voltage suppression control.

First, the motor power consumption suppression processing for suppressing power consumption of the motor 5 to a value equal to or smaller than the power limit value is explained. The motor-power-consumption calculating unit 29a performs calculation of Formula (3) using the dq-axis current 25 and the dq-axis voltage command 24 and derives the motor power consumption 29b. Note that, in Formula (3), Pow represents motor power consumption, Vd* represents d-axis voltage command, Vq* represents q-axis voltage command, Id represents d-axis current, and Iq represents q-axis current. The power consumption Pow calculated by Formula (3) includes a motor machine output, a machine loss such as machine friction, a motor copper loss, and a motor iron loss. When a loss of the inverter 3 is large or when a wire from the direct-current power supply 2 to the inverter 3 and a wire from the inverter 3 to the motor 5 are long and a loss of the wires cannot be neglected, by adding the losses to a calculation result of Formula (3), it is possible to highly accurately suppress electric power output from the direct-current power supply 2 to a power limit value. However, even if the calculation of Formula (3) is not performed, it is also possible to detect a direct current and a direct-current voltage in the wire from the direct-current power supply 2 to the inverter 3 and use integrated values of the direct current and the direct-current voltage.

$$Pow = V_d^* \cdot I_d + V_q^* \cdot I_q \qquad (3)$$

A subtracter 29j calculates a difference 29c between the motor power consumption 29b calculated by the motor-power-consumption calculating unit 29a and the power limit value 28 output from the communication/parameter storing unit 11, and outputs the difference 29c to the integrating unit 29d.

The integrating unit 29d applies integration gain multiplication and integration processing to the difference 29c, and calculates a q-axis current command correction signal in the dq-axis current correction signal 19 transmitted to the current-command correcting unit 20. The current-command correcting unit 20 subtracts a q-axis current command correction signal from the original q-axis current command such that an absolute value of the torque of the motor 5 decreases.

The power consumption of the motor 5 calculated by Formula (3) is an added-up value of the motor machine output and the motor loss. The motor machine output is a product of motor speed and motor torque. Therefore, the motor power consumption is suppressed by suppressing the motor torque. When the motor power consumption exceeds the power limit value 28, the q-axis current command correction signal has a positive value. In that case, during motor power running, the current-command correcting unit 20 simply applies subtraction processing to the q-axis current command. However, during motor regeneration, the current-command correcting unit 20 reverses the polarity of the q-axis current command correction signal and performs subtraction processing such that an absolute value of the q-axis current command decreases. Note that, in the first embodiment, the current-command correcting unit 20 is configured to perform correction of the q-axis current command. However, because the motor torque also increases or decreases in the same polarity as an increase or decrease in the q-axis current, the same effect is obtained when the current-command correcting unit 20 is configured to correct the torque command 16.

The motor driving voltage suppression processing for suppressing the voltage required for the motor driving to a value equal to or smaller than the voltage limit value 27 is explained. The q-axis-voltage-limit calculating unit 29e calculates a q-axis voltage limit value 29f, by applying the dq-axis voltage command 24 output from the current control unit 22 and the voltage limit value 27 output from the communication/parameter storing unit 11 to Formula (4). Note that, in Formula (4), VqLim is equivalent to the q-axis voltage limit value 29f. VnLim represents the voltage limit value 27. Vd* represents d-axis voltage command obtained from the dq-axis voltage command 24.

$$V_{qLim} = \sqrt{V_{nLim}^2 - V_d^{*2}} \quad (4)$$

The q-axis-voltage extracting unit 29g extracts only a command for a q-axis voltage from the dq-axis voltage command 24 output from the current control unit 22, and outputs the command for the q-axis voltage as a q-axis voltage command 29h.

A subtracter 29k calculates a difference 29i between the q-axis voltage command 29h calculated by the q-axis-voltage extracting unit 29g and the q axis voltage limit value 29f calculated by the q-axis-voltage-limit calculating unit 29e, and outputs the difference 29i to the integrating unit 29d.

The integrating unit 29d applies integration gain multiplication and integration processing to the difference 29i, and calculates a d-axis current command correction signal in the dq-axis current command correction signal 19 transmitted to the current-command correcting unit 20. The current-command correcting unit 20 performs correction for subtracting the d-axis current command correction signal from the d-axis current command.

The amplitude of a voltage command includes a d-axis (excitation) current and an induced voltage generated by rotation of a magnetic flux by a permanent magnet of a rotor of the motor 5. A component of the induced voltage mainly appears on the q-axis side. Therefore, because the current-command correcting unit 20 can suppress the q-axis voltage by correcting the d-axis current command on the basis of the q-axis voltage, it is possible to realize suppression of the voltage required for the motor driving. Note that, because of a characteristic of the induced voltage explained above, the current-command correcting unit 20 can be configured to correct the d-axis current and the magnetic flux by the permanent magnet of the motor 5, or when the magnetic-flux control unit is present, correct a magnetic flux command.

The integrating unit 29d performs the integration processing as explained above. However, when the correction of the dq-axis current command is unnecessary, the integrating unit 29d stops the operation. That is, the integrating unit 29d provides a lower limit value in an integrator incorporated therein and sets the lower limit value to zero. Therefore, the dq-axis current command correction signal 19 does not have a negative value. Note that the integration processing is carried out by the integrator for the purpose of retaining current command correction signals of the d axis and the q axis and preventing chattering of ON/OFF of current command correction operations of the d axis and the q axis to make it possible to perform power/voltage suppression control processing.

As explained above, the current-command correcting unit 20 subtracts the dq-axis current command correction signal from the dq-axis current command 18. Thereafter, the current-command correcting unit 20 calculates the amplitude of a current command from the dq-axis current command after the subtraction using Formula (5). Note that, in Formula (5), Id* represents d-axis current command after the subtraction processing, Iq* represents q-axis current command, and In* represents current command amplitude to be calculated.

$$I_n^* = \sqrt{I_d^{*2} + I_q^{*2}} \quad (5)$$

When the current command amplitude obtained by Formula (5) exceeds maximum current amplitude determined by the specifications of the motor 5 and the inverter 3, the current-command correcting unit 20 suppresses the d-axis current command and the q-axis current command and keeps the current command amplitude to be within an allowable range while maintaining a ratio of the d-axis current command and the q-axis current command, and outputs d-axis current command and the q-axis current command as the dq-axis current command 21 after the correction. Specifically, when the maximum current amplitude determined by the motor 5 and the inverter 3 is represented by Inmax, the current-command correcting unit 20 carries out displacement indicated by Formula (6) and Formula (7).

$$I_d^* \Leftarrow I_d^* \frac{I_{nmax}}{I_n^*} \quad (6)$$

$$I_q^* \Leftarrow I_q^* \frac{I_{nmax}}{I_n^*} \quad (7)$$

Note that, when the limitation of the current amplitude by Formula (6) and Formula (7) is performed, the integrating unit 29d in the power-voltage limiting unit 29 avoids excessive accumulation of integrated values of the integrator. Therefore, an integrator operation for increasing an integrator output is stopped.

As explained above, when the motor power consumption is suppressed to a value equal to or smaller than the power limit value 28, the q-axis current is corrected. However, as it is evident from the circuit equation of Formula (1), the d-axis voltage changes and the voltage required for the motor driving also changes according to the change in the q-axis current. When the voltage required for the motor driving is suppressed to a value equal to or smaller than the voltage limit value 27, the d-axis current is corrected. However, a copper loss of the motor wire increases or decreases, and the motor power consumption also changes according to the correction of the d-axis current. In this way, interference is present between two physical quantities, i.e., the motor power consumption and the voltage required for the motor driving. Therefore, by causing the motor power consumption suppression processing and the motor driving voltage suppression processing to operate simultaneously and in parallel, it is possible to markedly improve accuracy of both of the kinds of control processing. As a result, it is possible to apply smaller-capacity models concerning the inverter 3 and the direct-current power supply 2. There is an effect that costs are reduced.

Figure 2:
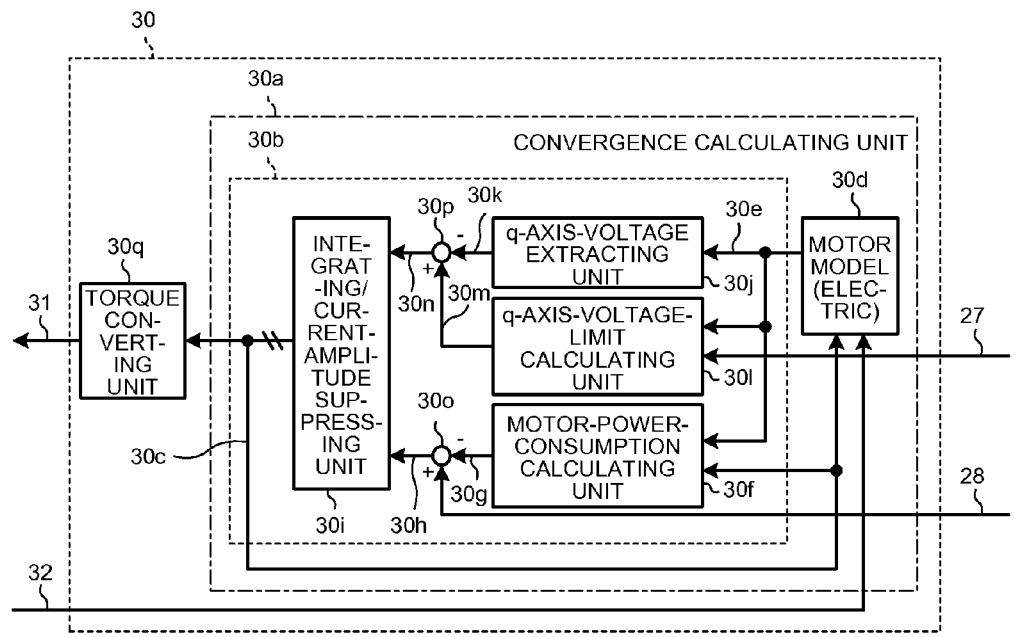
FIG. 2 is a block diagram of a configuration example of a torque-limit output unit shown in FIG. 1.

The torque-limit output unit 30 is explained with reference to FIG. 2 and FIG. 3 in which configuration examples are shown. In FIG. 2, the torque-limit output unit 30 calculates a torque limit value 31 on the basis of the voltage limit value 27, the power limit value 28, and motor rotor speed information 32, for example, as shown in FIG. 2, according to the operation of a convergence calculating unit 30a and a torque converting unit 30q.

The convergence calculating unit 30a includes a motor model 30d and a model-power/voltage limiting unit 30b. The motor model 30d performs calculation of a model dq-axis voltage 30e using a model dq-axis current 30c, which is an output of the model-power/voltage limiting unit 30b, and the motor rotor speed information 32. Specifically, the motor model 30d carries out the calculation of Formula (1).

The model-power/voltage limiting unit 30b includes a motor-power-consumption calculating unit 30f, a q-axis-voltage-limit calculating unit 30l, a q-axis-voltage extracting unit 30j, subtracters 30o and 30p, and an integrating/current-amplitude suppressing unit 30i. That is, the model-power/voltage limiting unit 30b performs an operation substantially the same as the operation of the electric power/voltage adjusting unit 29 with a configuration substantially the same as the electric power/voltage limiting unit 29.

The motor-power-consumption calculating unit 30f calculates motor model power consumption 30g on the basis of the model dq-axis voltage 30e output from the motor model 30d and the model dq-axis current 30c, which is the output of the model-power/voltage limiting unit 30b. A loss taken into account in Formula (1) is a motor copper loss. When a motor iron loss, a conduction loss in a wire, and a motor machine loss are modeled, the motor-power-consumption calculating unit 30f performs the calculation including values of these losses.

The subtracter 30o calculates a difference 30h between the motor model power consumption 30g and the power limit value 28 and outputs the difference 30h to the integrating/current-amplitude suppressing unit 30i. The integrating/current-amplitude suppressing unit 30i applies integration processing to the difference 30h and calculates a model d-axis current in the model dq-axis current 30c.

The model-q-axis-voltage-limit calculating unit 30l calculates a model q-axis voltage limit value 30m as in Formula (4). The q-axis-voltage extracting unit 30j selects only a q-axis voltage from the model dq-axis voltage 30e generated by the motor model 30d and outputs the q-axis voltage as a model q-axis voltage 30k.

The subtracter 30p calculates a difference 30n between the model q-axis voltage limit value 30m and the model q-axis voltage 30k and outputs the difference 30n to the integrating/current-amplitude suppressing unit 30i. The integrating/current-amplitude suppressing unit 30i applies integration processing to the difference 30n and calculates a model q-axis current in the model dq-axis current 30c. The integrating/current-amplitude suppressing unit 30i combines the model d-axis current and the model q-axis current to obtain the model dq-axis current 30c. The torque converting unit 30q converts the model dq-axis current 30c and generates the torque limit value 31.

As explained above, the torque-limit output unit 30 shown in FIG. 2 performs the calculation of the torque limit value 31 according to the operations of the motor model 30d, the model-power/voltage limiting unit 30b, and the torque converting unit 30q. That is, the torque-limit output unit 30 is configured to calculate, according to convergence calculation, a dq-axis current that satisfies a condition that the voltage and the power consumption of the motor model 30d are equal to or smaller than the power limit value 28 and equal to or smaller than the voltage limit value 27 and has maximum torque, calculate the torque limit value 31 from the dq-axis current, and output the torque limit value 31. Therefore, the configuration of the model-power/voltage limiting unit 30b is substantially the same as the configuration of the electric power/voltage limiting unit 29 explained with reference to FIG. 1. When this system is used, it is possible to determine a torque limit value, by taking into account a power consumption increase by the d-axis current in advance.

Note that a difference in the subtracters 29i and 29k in the electric power/voltage limiting unit 29 shown in FIG. 1 and a difference in the subtracters 30o and 30p in the model-power/voltage limiting unit 30b shown in FIG. 2 have different sings. This is because, whereas the electric power/voltage limiting unit 29 generates the dq-axis current command correction signal 19 for the dp-axis current command 18 present separately, the model-power/voltage limiting unit 30b generates the dq-axis current itself.

Further, when the d-axis current has only a negative value, setting of an upper limit value 0 is provided in the integrator that outputs the model d-axis current in the integrating/current-amplitude suppressing unit 30i. On the other hand, to obtain the q-axis current having the maximum torque, an upper limit value or a lower limit value are not particularly provided in the integrator that outputs the model q-axis current in the integrating/current-amplitude suppressing unit 30i. In this case, a value retained by the integrator in the integrating/current-amplitude suppressing unit 30i is an initial value of the dq-axis current by the convergence calculation.

As explained concerning the current-command correcting unit 20, the integrating/current-amplitude suppressing unit 30i takes a measure for avoiding excessive accumulation of values of the incorporated integrator together with suppression of current amplitude. In the integrator of the integrating/current-amplitude suppressing unit 30i, a maximum torque current value allowed by the motor 5 is set as an initial value in the convergence calculation of the q-axis current. The initial value in the convergence calculation of the d-axis current is set to zero.

The convergence calculation is carried out every time the motor rotor speed information 32 varies. In general, the convergence calculation is realized by an electronic circuit such as an FPGA or software on a computer configuring the motor control apparatus 1a, and is periodically and discretely executed. A circuit operation for the convergence calculation is considered to be sufficiently faster than a rotor speed change of the motor 5. The speed of the circuit operation is a value close to motor rotor speed during the convergence calculation carried out last time. The dq-axis current obtained by the convergence calculation is also a value close to the last result. Therefore, when a value obtained in the last convergence calculation is used as an initial value in the integrator in the motor-power-consumption calculating unit 30l, this leads to a reduction in the number of times of the convergence calculation.

After the convergence calculation ends, the torque converting unit 30q applies the model dq-axis current 30c obtained by the convergence calculation to Formula (8) to calculate torque Ta and outputs the torque Ta as the torque limit value 31.

$$T_a = P \cdot \Phi \cdot I_q + P(L_d - L_q) \cdot I_d \cdot I_q \qquad (8)$$

For the calculation for calculating the dq-axis current explained above, for example, the Newton's method can be used. The calculation method for the torque limit value 31 by the convergence calculation explained above has an advantage that it is unnecessary to grasp in advance presence of a solution meeting all the calculation conditions such as the power limit value 28 and the voltage limit value 27, and even if such a solution is absent, a solution meeting conditions relatively close to the calculation conditions can be output.

Figure 3:
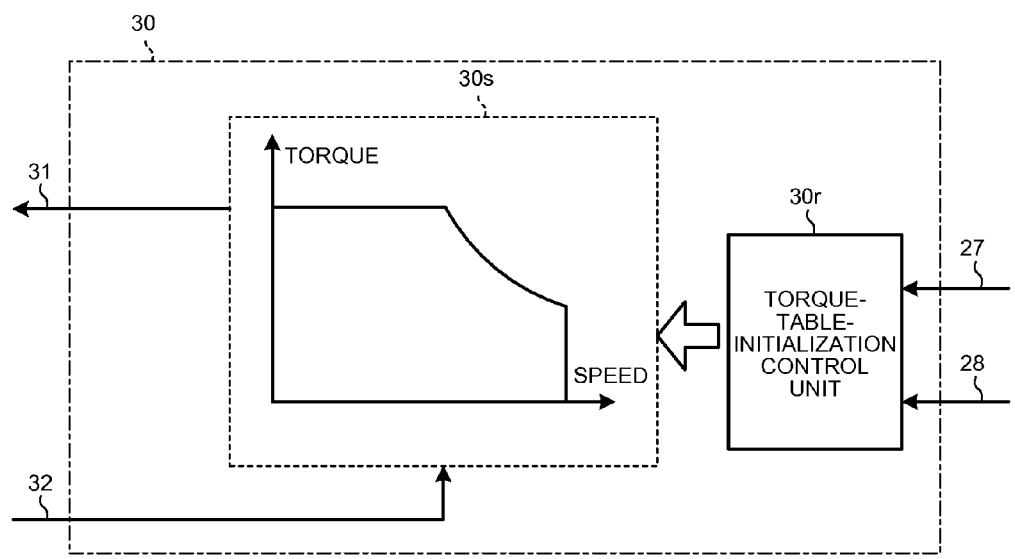
FIG. 3 is a block diagram of another configuration example of the torque-limit output unit shown in FIG. 1.

Instead of the configuration shown in FIG. 2 for performing the convergence calculation explained above, the torque-limit output unit 30 can be configured using, for example, as shown in FIG. 3, a torque-table-initialization control unit 30r, a torque table 30s configured to store a torque limit value corresponding to motor rotor speed, and a torque-limit-value output unit (not shown).

The torque-table initializing unit 30r carries out the convergence calculation explained in FIG. 2 at every motor rotor speed in advance, before the start of the operation of the motor 5, or at timing when the power limit value is changed or at timing when the voltage limit value is changed. The torque-table initializing unit 30r sets the torque limit value thus obtained into the torque table 30s. The torque-limit-value output unit (not shown) outputs the torque limit value 31, referring to the torque table 30s, on the basis of the motor rotor speed information 32 during the motor operation. With such a configuration, torque that sets power consumption and a driving voltage during motor driving in predetermined ranges is calculated in advance. Therefore, it is unnecessary to cause the convergence calculation processing shown in FIG. 2 to operate in parallel to the position, speed, and current control processing for the motor. Consequently, a processing load is reduced.

The position-command generating unit 13 includes an acceleration/deceleration setting unit 13a and a motor model 13c. The motor model 13c calculates model speed 13d and a model position 13e according to an imaginary machine equation represented by Formula (9) and Formula (10). The motor model 13c outputs the model speed 13d to the acceleration/deceleration setting unit 13a, and allocates the model speed 13d to the motor rotor speed information 32 used in the torque-limit output unit 30. The motor model 13c outputs the model position 13e to the reaching-time-estimation-sequence control unit 33, and allocates the model position 13e to the position command 14 given to the position/speed control unit 15. Note that, in Formula (9) and Formula (10), Tb represents model torque 13b output from the acceleration/deceleration setting unit 13a, ωrm represents the model speed 13d output to the acceleration/deceleration setting unit 13a, and θrm represents the model position 13e output to the acceleration/deceleration setting unit 13a.

$$\frac{d\bar{\omega}_{rm}}{dt} = \frac{T_b}{J_m} \quad (9)$$

$$\frac{d\theta_{rm}}{dt} = \omega_{rm} \quad (10)$$

Motor rotor speed, a speed command, or the like calculated from the detected motor position 7 can be allocated to the motor rotor speed information 32 used in the torque-limit output unit 30. However, the motor rotor speed, the speed command, or the like tends to be affected by a disturbance such as an error involved in modeling of the motor such as machine friction or load torque, speed control deviation, or noise included in the detected motor position 7. On the other hand, when the model speed 13d is used, it is possible to perform stable position command generation avoiding the influence of the disturbance such as the noise.

The acceleration/deceleration setting unit 13a receives the torque limit value 31 output from the torque-limit output unit 30, the model speed 13d and the model position 13e output from the motor model 13c, and the reference position 12 and the position control time maximum speed 35 output from the communication/parameter storing unit 11, generates the model torque 13b used for the calculation of the machine equation of the motor model 13c, and outputs the model torque 13b to the motor model 13c.

Figure 4:
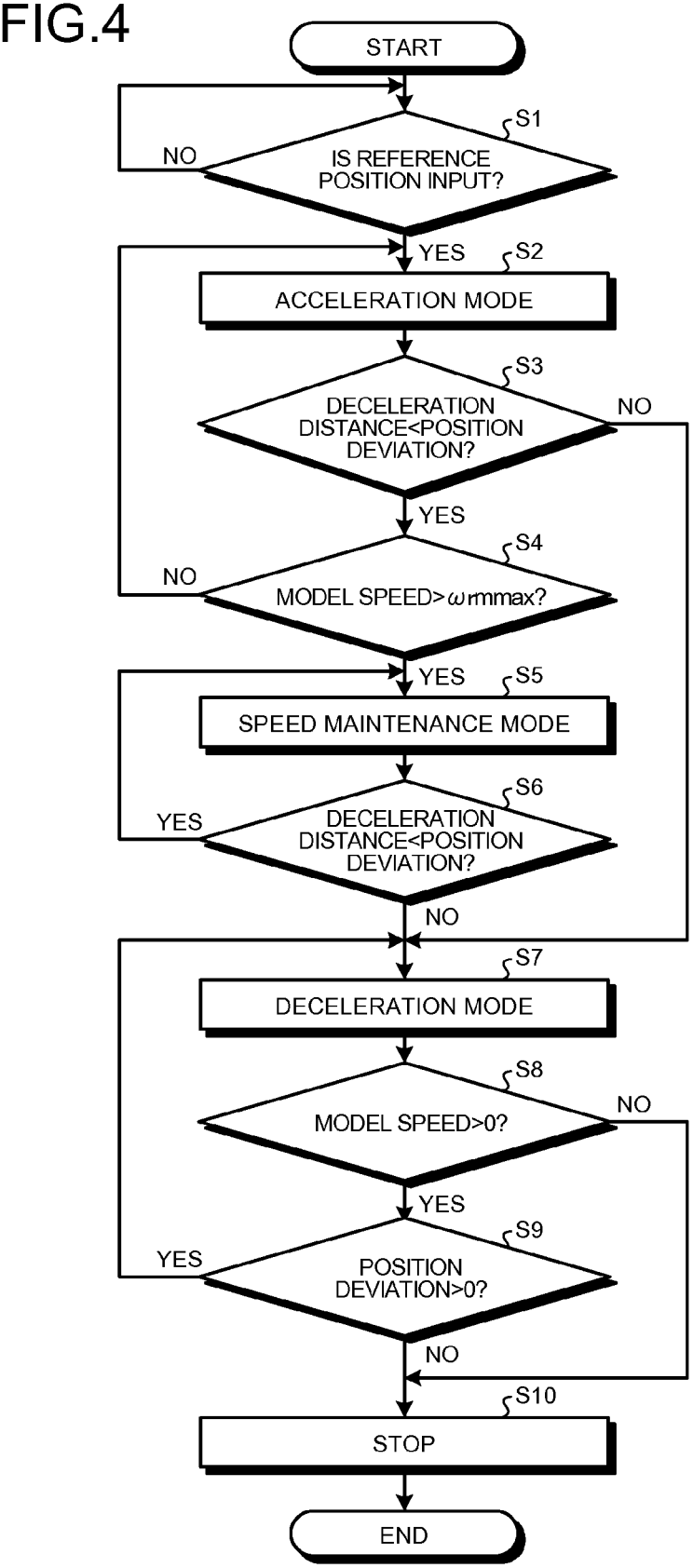
FIG. 4 is a flowchart for explaining a procedure in which an acceleration/deceleration setting unit determines acceleration and deceleration of a motor model in a position-command generating unit shown in FIG. 1.

FIG. 4 is a flowchart for explaining a procedure in which the acceleration/deceleration setting unit determines acceleration or deceleration of the motor model in the position-command generating unit shown in FIG. 1. In FIG. 4, when the reference position 12 is input (Yes at step S1), the acceleration/deceleration setting unit 13a notifies the motor model 13c of the reference position 12 using the model speed 13b, shifts to an acceleration mode (step S2), and determines whether position deviation of the model position 13e with respect to the reference position 12 is larger than a deceleration distance (step S3). The motor model 13c starts acceleration.

When the position deviation of the model position 13e with respect to the reference position 12 is larger than the deceleration distance at step S3 (Yes at step S3), the acceleration/deceleration setting unit 13a determines whether the model speed 13d is larger than ωrmmax (the position control time maximum speed 35) (step S4). When the model speed 13d is smaller than ωrmmax (No at step S4), the acceleration/deceleration setting unit 13a proceeds to step S2. When the model speed 13d is larger than the ωrmmax (Yes at step S4), the acceleration/deceleration setting unit 13a proceeds to step S5.

That is, when a situation continues in which the position deviation of the model position 13e with respect to the reference position 12 is larger than the deceleration distance (Yes at step S3) and the model speed 13d is smaller than ωrmmax (No at step S4), the acceleration/deceleration setting unit 13a maintains the acceleration mode (step S2).

Thereafter, when the position deviation of the model position 13e with respect to the reference position 12 is larger than the deceleration distance (Yes at step S3) but the model speed 13d is larger than ermmax (Yes at step S4), the acceleration/deceleration setting unit 13a shifts to a speed maintenance mode (step S5). While the position deviation of the model position 13e with respect to the reference position 12 is larger than the deceleration distance (Yes at step S6), the acceleration/deceleration setting unit 13a maintains the speed maintenance mode (step S5).

When the position deviation of the model position 13e with respect to the reference position 12 is larger than the deceleration distance (No at step S3) while the acceleration/deceleration setting unit 13a maintains the acceleration mode (step S2) or when the position deviation of the model position 13 with respect to the reference position 12 is smaller than the deceleration distance (No at step S6) while the acceleration/deceleration setting unit 13a maintains the speed maintenance mode (step S5), the acceleration/deceleration setting unit 13a shifts to a deceleration mode (step S7).

Thereafter, while the model speed 13d is larger than a value 0 (Yes at step S8) and the position deviation of the model position 13e with respect to the reference position 12 is larger than a value 0 (Yes at step S9), the acceleration/deceleration setting unit 13a maintains the deceleration mode (step S7). In a process in which the deceleration mode is maintained, when the model speed 13d decreases to the value 0 in a process in which the deceleration mode is maintained (No at step S8) or when the position deviation of the model position 13e with respect to the reference position 12 decreases to the value 0 (No at step S9), the acceleration/deceleration setting unit 13a stops the operation (step S10) and ends this procedure.

Note that the deceleration distance indicates an amount of change of a position to which the work piece moves during deceleration. During the acceleration mode, the acceleration/deceleration setting unit 13a allocates the model position 13e at an instance of the shift from the acceleration mode to the speed maintenance mode to a retained value. This is based on an idea that a distance required for acceleration (the amount of change of the position) is equal to a distance required for deceleration.

The model speed 13 generated by the cooperation of the acceleration/deceleration setting unit 13a and the motor model 13c explained above is input to the torque-limit output unit 30 as the motor rotor speed information 32. The model position 13e generated by the same cooperation is input to the position/speed control unit 15 and the reaching-time-estimation-sequence control unit 33 as the position command 14.

In the position-command generating unit 13, torque used for acceleration and deceleration does not have to be a fixed value. That is, the torque has a characteristic that the shape of the torque limit value with respect to the motor rotor speed can be an arbitrary waveform. On the other hand, in the conventional motor position control processing, torque used for acceleration and deceleration is fixed, and position command generation is performed such that a speed pattern of the torque is trapezoidal or triangular with respect to time.

Figure 5:
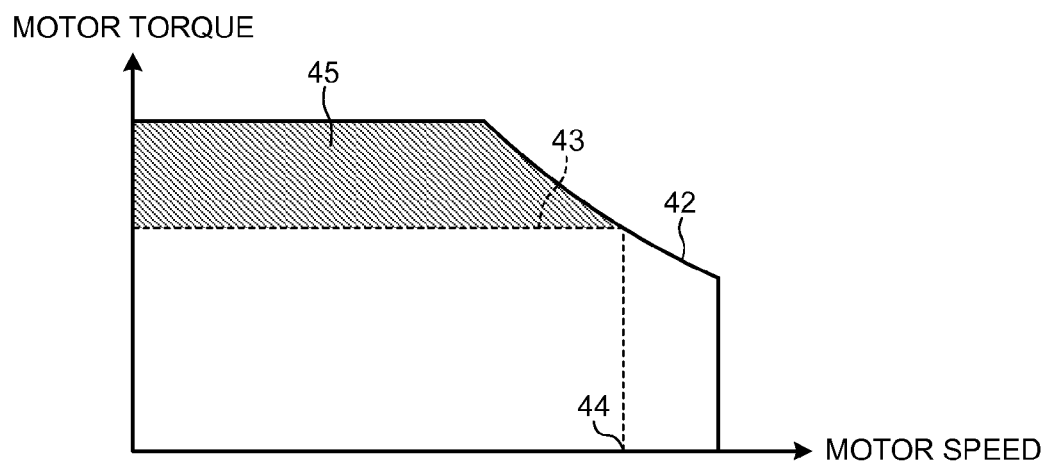
FIG. 5 is a diagram of a calculation example of a torque table in the torque-limit output unit shown in FIG. 3.

Torque patterns are explained with reference to FIG. 5. Note that FIG. 5 is a diagram of a calculation example of a torque table in the torque-limit output unit shown in FIG. 3. In FIG. 5, a substantially trapezoidal torque pattern 42 indicated by a thick solid line is a torque limit value obtained by the processing in the torque-limit output unit shown in FIG. 3. A square torque pattern 43 surrounded by a chain line in the torque limit value 42 indicates a torque pattern used when the conventional position control by fixed torque is performed. A user sets maximum speed 44 allowed during position control. A region 45 hatched in an upper side portion of the torque pattern 43 in use indicates torque not used in the conventional position control by the fixed torque. According to the first embodiment, in the position-command generating unit 13, because the torque used for acceleration and deceleration does not have to be a fixed value, the torque in the region 45 can also be used. Therefore, it is possible to reduce time required to control the rotor of the motor 5 to a reference position.

It goes without saying that, in the first embodiment, if the torque limit value 42 is determined as shown in FIG. 5, a value of acceleration and deceleration torque is set by the maximum speed 44 allowed during the position control. Therefore, the conventional position control by the fixed torque can be performed.

Subsequently, the reaching-time-estimation-sequence control unit 33 causes, before the start of the operation of the motor 5, the torque-limit output unit 30 and the position-command generating unit 13 respectively to virtually perform simulating operations, estimates time until the model position 13e reaches the reference position 12, and transmits the time to the host control apparatus 10 via the communication/parameter storing unit 11 as the estimated reaching time 34. When the received estimated reaching time 34 is longer than, for example, an assumed reaching time, the host control apparatus 10 carries out adjustment again, for example, increases the power limit value 28 and transmits the power limit value 28 to the motor control apparatus 1a. Consequently, appropriate power/voltage limit setting in the host control apparatus can be performed.

In a system in which a plurality of motors and a plurality of inverters are connected to the direct-current power supply 2 besides the motor 5 and the inverter 3 and the host control apparatus 10 collectively controls the motors and the inverters, the estimated reaching time 34 is essential to scheduling of an associated operation of the motors. When position command generation by a triangular speed pattern or a trapezoidal speed pattern by the conventional fixed torque acceleration and deceleration is performed, a reaching time to a reference position can be analytically calculated from conditions such as torque and motor inertia. However, in a method of using the torque limit value 31 to the maximum, it is difficult to analytically derive the reaching time to the reference position. A simulating operation for calculating the estimated reaching time 34 is used.

As explained above, when a position command for a reference position is generated, a position command is generated with reference to a torque limit value with which motor power consumption is equal to or smaller than a predetermined motor power limit value and voltage amplitude required for motor driving is equal to or smaller than a predetermined voltage limit, according to the torque limit value. Therefore, it is possible to, while suppressing the power consumption of the motor to a value equal to or smaller than the power limit value and suppressing a voltage required for driving the motor to a value equal to or smaller than the voltage limit value, stably and smoothly carry out control for causing a rotor position of the motor to follow the reference position.

Consequently, because smaller-capacity models can be applied to the inverter 3 and the direct-current power supply 2, there is an effect of reducing costs. Conversely, because necessary electric power and a necessary voltage can be grasped in advance, there is also an effect that selection work for the direct-current power supply 2 is simplified. In addition, for example, a positioning time can be reduced by suppressing power use in the daytime and using large power at night. Therefore, it is possible to contribute to planned power consumption in a facility where the motor control apparatus is set.

Note that, even if the electric power/voltage limiting unit 29 is not used, generation of the position command 14 conforming to the torque limit value 31 output by the torque-limit output unit 30 can be performed. Therefore, it is possible to simultaneously attain suppression of motor power consumption and suppression of a motor driving voltage. However, when the electric power/voltage limiting unit 29 is combined, motor maximum speed can be further increased by suppression of an induced voltage by correction of the d-axis current. Therefore, there is an effect that it is possible to attain a reduction in time required for position control to a reference position, that is, positioning.

When the electric power/voltage limiting unit 29 is combined, even if an increase in motor power consumption and an increase in a driving voltage occur because of the motor model 30d of the torque-limit output unit 30 and a modeling error of the motor 5, the electric power/voltage limiting unit 29 absorbs the increases through current command correction by a feedback. Therefore, it is possible to highly accurately suppress motor power consumption and a voltage required for motor driving to values equal to or smaller than limit values.

On the other hand, even when only the electric power/voltage limiting unit 29 is used, it is possible to suppress the power consumption of the motor to a value equal to or smaller than the power limit value 28 and suppress the voltage required for the driving of the motor to a value equal to or smaller than the voltage limit value 27. However, in this case, when the power consumption of the motor and the voltage required for the driving of the motor respectively reach the limit values, in some case, a difference between output torque of the motor and torque assumed by the position-command generating unit is conspicuous.

A position control system includes many time-dependent sections such as the integrator and the filter. Therefore, there is a problem in that a control system is complicated when the position control system takes measures against the torque error. In this regard, in the first embodiment, position command generation conforming to a torque limit value output by the torque-limit output unit 30 is performed in advance. Therefor, there is an effect that it is possible to omit the measures against the torque error and attain smooth position control.

In the first embodiment, the motor control apparatus 1*a* includes the torque-limit output unit 30 and the position-command generating unit 13. However, the host control apparatus 10 can be configured to carry out a series of processing by including setting of a power limit value and a voltage limit value, and transmit an obtained position command to the motor control apparatus 1*a*. The present invention is not limited to this. It goes without saying that the respective kinds of processing can be shared according to applied hardware. The essence of the present invention for causing the motor to operate at a voltage equal to or smaller than a power limit value and a voltage equal to or smaller than a voltage limit value does not change.

Second Embodiment

Figure 6:
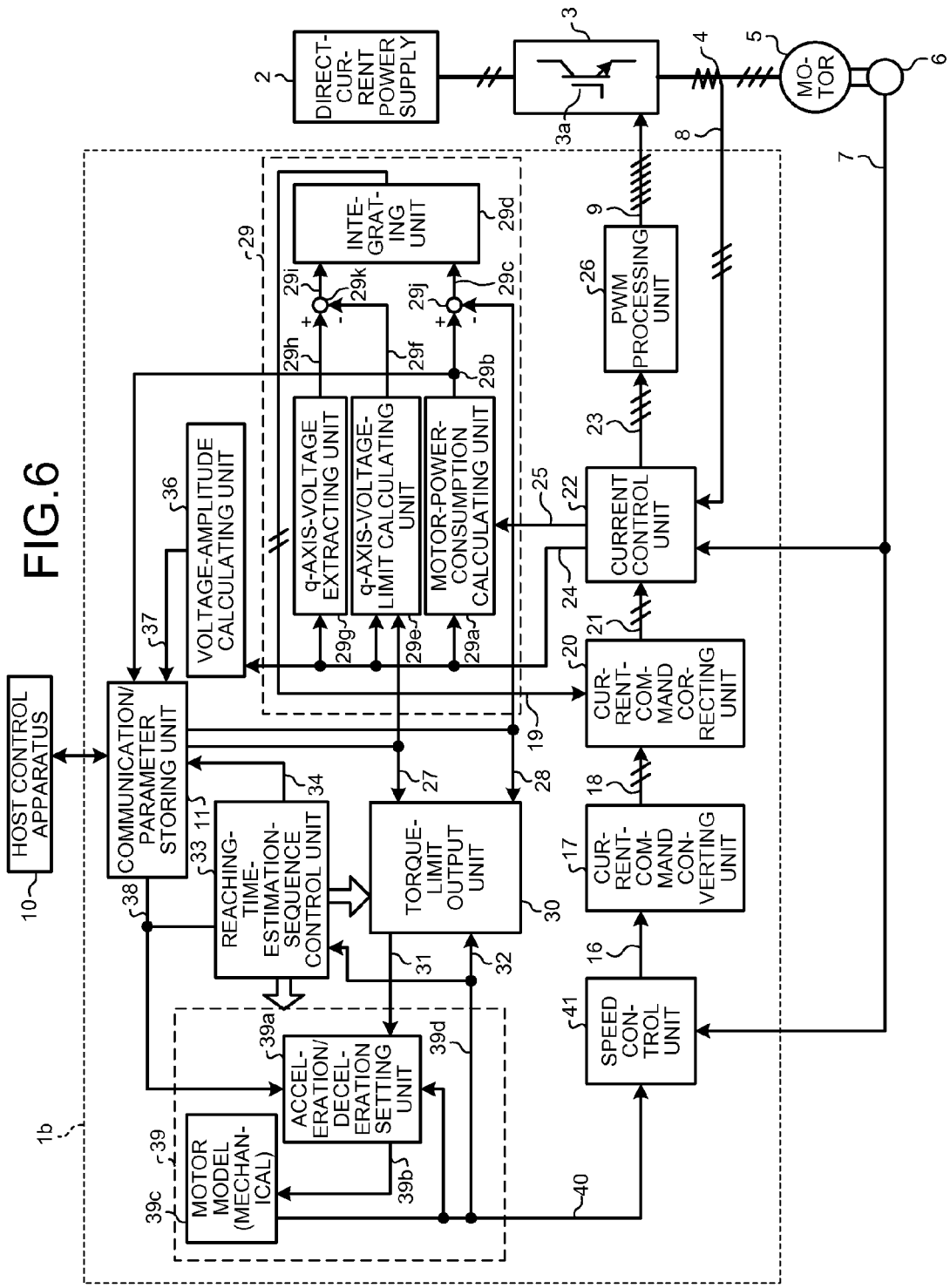
FIG. 6 is a block diagram of the configuration of a motor control apparatus according to a second embodiment of the present invention.

FIG. 6 is a block diagram of the configuration of a motor control apparatus according to a second embodiment of the present invention. A motor control apparatus 1*b* according to the second embodiment includes a speed control configuration for controlling rotor speed of the motor 5 to reference speed while suppressing power consumption of the motor 5 and a voltage required for driving of the motor 5 respectively to values equal to or smaller than predetermined values. Note that, in FIG. 6, components same as or equivalent to the components shown in FIG. 1 (the first embodiment) are denoted by the same reference numerals and signs. Components related to the second embodiment are mainly explained.

In FIG. 6, in the motor control apparatus 1*b* according to the second embodiment, a speed-command generating unit 39 and a speed control unit 41 are provided respectively instead of the position-command generating unit 13 and the position/speed control unit 15 in the configuration shown in FIG. 1 (the first embodiment).

The speed-command generating unit 39 includes an acceleration/deceleration setting unit 39*a* and a motor model 39*c*. The speed-command generating unit 39 generates a speed command 40 given to the speed control unit 41 and motor rotor information 32 given to the torque-limit output unit 30, on the basis of the reference speed 38 input through the communication/parameter storing unit 11 transmitted by the host control apparatus and the torque limit value 31 output by the torque-limit output unit 30.

The operation of the speed-command generating unit 39 is explained. The acceleration/deceleration setting unit 39*a* determines acceleration or speed maintenance on the basis of a reference speed 38 input from the communication/parameter storing unit 11, the torque limit value 31 output by the torque-limit output unit 30, and model speed 39*d* output from the motor model 39*c*, generates a model torque 39*b* indicating a result of the determination, and outputs the model torque 39*b* to the motor model 39*c*.

Like the motor model 13*c* in the position-command generating unit 13, the motor model 39*c* calculates the model speed 39*d* using the Formula (9) and outputs the model speed 39*d* to the acceleration/deceleration setting unit 39*a*. The acceleration/deceleration setting unit 39*a* simply compares the reference speed 38 and the model speed 39*d*. When the model speed 39*d* is lower than the reference speed 38, the acceleration/deceleration setting unit 39*a* outputs the torque limit value 31 to the motor model 39*c* as the model torque 39*b*. When the model speed 39*d* is equal to or higher than the reference speed 38, the acceleration/deceleration setting unit 39*a* reduces the model torque 39*b* output to the motor model 39*c* to zero.

The model speed 39*d* generated by the cooperation of the acceleration/deceleration setting unit 39*a* and the motor model 39*c* is input to the speed control unit 41 as the speed command 40 and input to the torque-limit output unit 30 and the reaching-time-estimation-sequence control unit 33 as the motor rotor speed information 32.

The speed control unit 41 calculates rotor speed of the motor 5 from the detected motor position 7, compares the calculated rotor speed and the speed command 40 output by the speed-command generating unit 39, performs control processing such that the rotor speed and the speed command 40 coincide with each other, and outputs the torque command 16. As in the first embodiment, the motor rotor speed information 32 is used for calculation of the torque limit value 31.

As in the first embodiment, before the start of motor operation, the reaching-time-estimation-sequence control unit 33 causes the torque-limit output unit 30 and the speed-command generating unit 39 to respectively virtually perform simulating operations, estimates time until the model speed 39*d* reaches the reference speed 38, and transmits the time to the host control apparatus 10 via the communication/parameter storing unit 11 as the estimated reaching time 34.

As explained above, according to the second embodiment, when a speed command for a reference speed is generated, the speed command is generated with reference to a torque limit value, with which motor power consumption is equal to or smaller than a predetermined motor power limit value and voltage amplitude required for motor driving is equal to or smaller than a predetermined voltage limit value, and according to the torque limit value. Therefore, while suppressing the power consumption of the motor to a value equal to or smaller than the power limit value and suppressing the voltage required for the driving of the motor to a value equal to or smaller than the voltage limit value, it is possible to stably and smoothly carry out control for causing rotor speed of the motor to follow the reference speed.

Consequently, because smaller-capacity models can be applied to the inverter 3 and the direct-current power supply 2, there is an effect that it is possible to reduce costs. Conversely, because necessary electric power and a necessary voltage can be grasped in advance, there is also an effect that selection work for the direct-current power supply 2 is simplified. In addition, for example, time required for speed control can be reduced by suppressing power use in the daytime and using large power at night. Therefore, it is possible to contribute to planned power consumption in a facility where the motor control apparatus is set.

Note that, even if the electric power/voltage limiting unit 29 is not used, generation of the speed command 40 conforming to the torque limit value 31 output by the torque-limit output unit 30 can be performed. Therefore, it is possible to simultaneously attain suppression of motor power consumption and suppression of a motor driving voltage. However, when the electric power/voltage limiting unit 29 is combined, motor maximum speed can be further increased by suppression of an induced voltage by correction of the d-axis current. Therefore, there is an effect that it is possible to control the rotor speed of the motor to higher reference speed.

On the other hand, even when only the electric power/voltage limiting unit 29 is used, it is possible to suppress the power consumption of the motor to a value equal to or smaller than the power limit value 28 and suppress the voltage required for the driving of the motor to a value equal to or smaller than the voltage limit value 27. In this case, as explained in the first embodiment, an error occurs between torque assumed for speed command generation and motor torque. However, when the motor control apparatus includes only a speed control system, sections depending on integration and time decrease compared with sections of the motor control apparatus including the position control system as well. Therefore, it is easy to take measures against the error that occurs between the torque motor assumed for the speed command generation and the motor torque. The error is not a problem. It is possible to realize smooth speed control by combining the speed command generation with the speed command generation conforming to the torque limit value 31.

Third Embodiment

Figure 7:
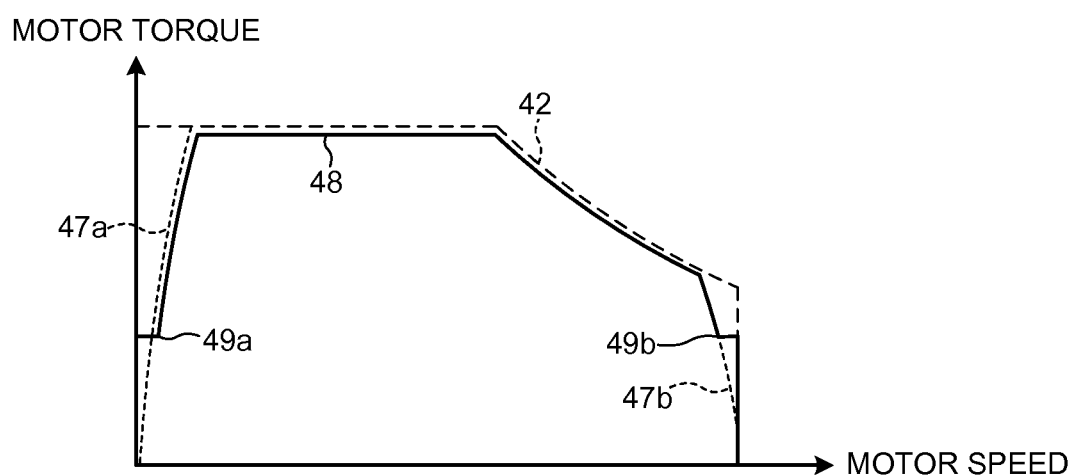
FIG. 7 is a diagram of a calculation example of a torque table in the torque-limit output unit shown in FIG. 3 in a third embodiment of the present invention.

FIG. 7 is a diagram of a correction example of a torque table in the torque-limit output unit shown in FIG. 3 in a third embodiment of the present invention.

In the first and second embodiments, the torque-limit output unit 30 shown in FIG. 1 and FIG. 6 can be configured as shown in FIG. 3. The torque limit value 42 shown in FIG. 5 is a torque limit value obtained by the processing in the torque-limit output unit shown in FIG. 3 (i.e., the torque limit value with respect to the motor rotating speed obtained by the convergence calculation explained in the first embodiment). However, in this torque limit value 42, maximum torque is shown near zero speed and torque having certain magnitude is shown near maximum speed. Large power consumption is generated near the zero speed and near the maximum speed.

Therefore, in an explanation in the third embodiment, to suppress an increase in power consumption due to a transient change of motor current, in the torque limit value 42 shown in FIG. 5, change ratios of torque build-up and torque build-down are set to be suppressed. Note that, for convenience of the explanation, the third embodiment is explained as an application example to the first embodiment.

As a specific method of suppressing change ratios of torque build-up at the start of acceleration and torque build-down at the start of deceleration, in the torque limit value 42 shown in FIG. 5, a method of suppressing torque in which the torque does not take a maximum value both near the zero speed and near the maximum speed is examined.

According to a torque table in which torque is suppressed not to be maximum torque near the zero speed and near the maximum speed in this way, built-up and build-down of torque generated at the start of acceleration and at the end of the acceleration of the motor 5 are smoothly carried out. Therefore, it is possible to suppress transient power consumption.

However, when the torque is zero near the zero speed and near the motor maximum speed, virtual speed cannot be started in the position command generation. To prevent this, some torque is left at both of the zero speed and the maximum speed.

Torque limit values are explained with reference to FIG. 7. In FIG. 7, the torque limit value 42 shown in FIG. 5 is indicated by a long chain line. A build-up portion and a build-down portion of the torque limit value 42 are corrected to change at gentle change ratios, as indicated by short chain lines 47a and 47b, and the torque limit value 42 changes to a torque limit value 48. Torques indicated by the short chain lines 47a and 47b that change at the gentle change ratios are torques limited according to Formula (20) explained below. Torques 49a and 49b used for the position command generation are left near zero speed and near maximum speed of the torque limit value 48.

Note that the limitation and the suppression of the torque change ratios can also be realized by applying low-pass filter processing and change ratio limiter processing to the model torque 13b explained in the first embodiment. However, when these kinds of processing are performed, a time series waveform of the model torque 13b during acceleration and a time series waveform of the model torque 13b during deceleration in the motor model 13c are different. This causes an excess or a shortage in a deceleration distance during position control.

In this regard, when correction is applied to the torque limit value 42 shown in FIG. 5, model torque waveforms during acceleration and during deceleration are symmetrical with respect to a time axis and are not affected by the acceleration and the deceleration.

A method of setting a torque limitation according to the third embodiment is explained. Motor power consumption including a transient term is represented by Formula (11) according to Formula (1) and Formula (3). Power consumption by the transient term is represented by "a product of a current change ratio and an electric current" indicated by an underline.

$$Pow = \omega_{re} \cdot \{\Phi + (L_d - L_q) \cdot I_d\} \cdot I_q + R(I_d^2 + I_q^2) + \underline{(pL_d \cdot i_d)i_d + (pL_q \cdot i_q)i_q} \tag{11}$$

Speed in the position command generation is roughly carried out in the order of (1) acceleration start, (2) acceleration, (3) acceleration stop, (4) fixed speed, (5) deceleration start, (6) deceleration, and (7) deceleration stop. Transient power consumption appears particularly conspicuously in such cases as changes (1) to (2), (3) to (4), (4) to (5), and (6) to (7).

Among these changes, concerning the changes (3) to (4) and (4) to (5), polarities of stationary power consumption immediately before the changes and transient power consumption during the changes are different. As a result, power consumption is not so large. For example, when the speed shifts from the acceleration to the fixed speed, because a torque current decreases from a positive value, electric power by an Iq transient term shown in a fourth term of Formula (11) has a negative value. However, because power consumption immediately before the changes is positive, a sum of the power consumption and the electric power does not exceed a limit unless a current change is particularly conspicuous. On the other hand, in the change (1) to (2) and the change (6) to (7), polarities of power consumption immediately before the changes and electric power by the transient term coincide with each other. It is likely that a sum of the power consumption and the electric power exceeds the limit.

The change (1) to (2) is explained as an example. A q-axis current is linearly built up and the q-axis current equivalent to torque described in a torque table limitation value is set to Iq0. When a change ratio of the build-up is represented as α, a time formula of a torque current is represented by Formula (12) and torque is represented by Formula (13). When a d-axis current is set to zero, an electrical angle frequency is represented as Formula (14) and motor power consumption is represented by Formula (15). Time Δt from the linear build-up of the q-axis current until the q-axis current equivalent to the torque described in the torque table limitation value reaches Iq0 is represented by Formula (16).

$$i_q = \alpha t \tag{12}$$

$$T_c = P \cdot \Phi \cdot \alpha t \tag{13}$$

$$\omega_{re} = \frac{P}{J_m}\int T_c \cdot dt = \frac{P^2 \cdot \Phi \cdot \alpha}{2 \cdot J_m} t^2 \quad (14)$$

$$Pow = \frac{P^2 \cdot \Phi^2 \cdot \alpha^2}{2 \cdot J_m} \cdot t^3 + R \cdot \alpha^2 \cdot t^2 + L_q \cdot \alpha^2 \cdot t \quad (15)$$

$$\Delta t = \frac{i_{q0}}{\alpha} \quad (16)$$

Because the motor power consumption represented by Formula (15) increases as time elapses, between 0 and Δt [sec], power consumption at the time Δt is the largest. Therefore, when the time Δt is substituted in Formula (15), Formula (17) is obtained. Formula (17) is a function of the change ratio α of the torque current build-up. Formula (17) is differentiated by the change ratio α to obtain Formula (18). When the change ratio α is changed and the calculation of Formula (17) is executed, the change ratio α having a changing polarity changes to the change ratio α for minimizing Formula (17). Therefore, when Formula (18) is put as zero, Formula (19) is obtained and the change ratio α at which the transient power consumption is minimized, that is, a change ratio of current build-up is obtained. In this case, a relation between torque and motor speed (an electrical angle frequency) is represented by Formula (20).

$$Pow = \frac{P^2 \cdot \Phi^2 \cdot \alpha^2}{2 \cdot J_m} \cdot \Delta t^3 + R \cdot \alpha^2 \cdot \Delta t^2 + \alpha^2 \cdot \Delta t = \quad (17)$$

$$\frac{P^2 \cdot \Phi^2 \cdot I_{q0}^3}{2 \cdot J_m} \cdot \frac{1}{\alpha} + R \cdot I_{q0}^2 + L_q \cdot \alpha \cdot I_{q0}$$

$$\frac{\partial Pow}{\partial \alpha} = -\frac{P^2 \cdot \Phi^2 \cdot I_{q0}^3}{2 \cdot J_m} \cdot \frac{1}{\alpha^2} + L_q \cdot I_{q0} = 0 \quad (18)$$

$$\alpha = \sqrt{\frac{P^2 \cdot \Phi^2 \cdot i_{q0}}{2 \cdot J_m \cdot L_q}} \quad (19)$$

$$T_d = \sqrt{2 \cdot J_m \cdot \alpha \cdot \omega_{rm}} \quad (20)$$

When correction of the torque table shown in FIG. 5 is carried out according to Formula (20), it is possible to attain suppression of the transient power consumption. Even if the calculation procedure explained above is used for the transient power consumption with respect to a change, an optimum value of q-axis current build-down cannot be obtained. However, when the q-axis current is built up gentler, the transient power consumption is suppressed. Therefore, the correction is performed with a waveform obtained by reversing torque correction near the zero speed obtained by Formula (20).

According to the third embodiment, the correction for suppressing and setting change ratios of torque build-up and torque build-down near the zero speed and near the maximum speed of the torque table is performed. Therefore, it is possible to make the build-up and the build-down of the torque gentle and suppress the transient power consumption. Even at the transient time, an operation with predetermined power consumption or less can be performed. Because the torque table can be formed taking into account the transient power consumption during the motor driving, improvement of accuracy of power consumption suppression can be attained. It goes without saying that the same effect, although not optimum, can be obtained as long as the torque table near the start of acceleration and near the end of deceleration is suppressed like a shape shown in FIG. 7 even if the correction is not performed strictly according to Formula (20).

In FIG. 1 and FIG. 6, a motor control apparatus is shown that divides an electric current of a motor into an excitation current component and a torque current component, which are components on a two-axis orthogonal rotation coordinate, and handles the electric current. The motor control apparatus includes a power/voltage limiting unit including a power calculating unit configured to calculate power consumption of the motor, a power limiting unit configured to limit the motor power consumption calculated by the power calculating unit to a value equal to or smaller than a predetermined motor power limit value, a torque-divided-voltage-limit-value calculating unit configured to calculate a torque divided voltage limit value of the motor, and a voltage limiting unit configured to limit a driving voltage of the motor to a value equal to or smaller than a predetermined motor voltage limit value. The power limiting unit corrects a motor torque current according to an excess amount of the motor power consumption with respect to the motor power limit value. The torque-divided-voltage-limit-value calculating unit calculates the torque divided voltage limit value of the motor on the basis of the motor voltage limit value and an excitation divided voltage of the motor. The voltage limiting unit corrects a motor excitation current according to the excess amount of a motor torque divided voltage with respect to the torque divided voltage limit value of the motor calculated by the torque-divided-voltage-limit-value calculating unit.

With this configuration, the power consumption of the motor is fed back and a torque current is corrected to reduce the power consumption to be equal to or smaller than a predetermine value. Therefore, output torque of the motor is suppressed. It is possible to highly accurately carry out control for suppressing the motor power consumption to a value equal to or smaller than the predetermined value in motor driving. The motor torque divided voltage is fed back and an excitation current of the motor is corrected. Therefore, an induced voltage of the motor is suppressed. It is possible to highly accurately carry out control for suppressing a voltage required for motor driving to a value equal to or smaller than a predetermined value in the motor driving.

In FIG. 2, FIG. 3, and FIG. 5, a motor control apparatus is shown that divides an electric current of a motor into an excitation current component and a torque current component, which are components on a two-axis orthogonal rotation coordinate, and handles the electric current. The motor control apparatus includes a torque-limit output unit including a motor model unit and a model-power/model-voltage limiting unit and configured to output a torque limit value, which is allowable torque of the motor, according to motor rotor speed. The model-power/model-voltage limiting unit includes a motor-model-power calculating unit configured to calculate motor model power consumption, a motor-model-power limiting unit configured to limit the motor model power consumption calculated by the motor-model-power calculating unit to a value equal to or smaller than a predetermined motor power limit value, a motor-model-torque-divided-voltage-limit-value calculating unit configured to calculate a torque divided voltage limit value of a motor model, and a motor-model-voltage limiting unit configured to limit a motor model driving voltage to a value equal to or smaller than a predetermined motor voltage limit value. The motor-model-power limiting unit corrects a motor model torque current according to an excess amount of the motor model power consumption with respect to the motor power limit value. The motor-model-torque-voltage-limit-value calculating unit calculates a torque divided voltage limit value of the motor model on the basis of the motor voltage limit value and an excitation divided voltage of the motor model. The motor-model-voltage limiting unit carries out, at each motor rotating speed, processing for correcting a motor model excitation current according to an excess amount of the motor model torque divided voltage with respect to the motor model torque divided voltage limit value, calculates torque of the motor model on the basis of a torque current of the motor model and an excitation current of the motor model obtained by the correction processing, and outputs the calculated torque of the motor model as a torque limit value.

With this configuration, the torque limit value with power consumption of the motor and a voltage required for driving taken into account in advance is calculated for each motor rotating speed by using the motor model. Motor control is performed such that motor torque does not exceed the torque limit value. Therefore, it is possible to limit the motor power consumption and the voltage required for the motor driving to values equal to or smaller than predetermined values and to reduce a processing load in performing the motor driving.

INDUSTRIAL APPLICABILITY

As explained above, the motor control apparatus according to the present invention is useful because the motor control apparatus can suppress power consumption of a motor and a voltage required for driving the motor within predetermined ranges.

REFERENCE SIGNS LIST 1a, 1b Motor control apparatuses
2 Direct-current power supply
3 Inverter
4 Current detector
5 Motor (embedded magnet synchronous motor: IPM)
6 Position detector
10 Host control apparatus
11 Communication/parameter storing unit
13 Position-command generating unit
13a, 39a Acceleration/deceleration setting units
13c, 39c Motor models (mechanical)
15 Position/speed control unit
17 Current-command converting unit
20 Current-command correcting unit
22 Current control unit
26 PWM processing unit
29 Power/voltage limiting unit
29a Motor-power-consumption calculating unit
29b Motor power consumption
29d Integrating unit
29e q-axis-voltage-limit calculating unit
29g q-axis-voltage extracting unit
29j, 29k Subtracters
30 Torque-limit output unit
30a Convergence calculating unit
30b Model-power/voltage limiting unit
30d Motor model
30f Motor-model-power-consumption calculating unit
30g Motor model power consumption
30i Integrating/current-amplitude suppressing unit
30j Model-q-axis-voltage extracting unit
30k Model q-axis voltage
30l Model q-axis-voltage-limit calculating unit
30m Model q-axis voltage limit value
30o, 30p Subtracters
30q Torque converting unit
30r Torque-table initializing unit
30s Torque table
33 Reaching-time-estimation-sequence control unit
36 Voltage-amplitude calculating unit
37 Voltage required for motor driving
39 Speed-command generating unit
41 Speed control unit

The invention claimed is:

1. A motor control apparatus comprising:
a position-command generating unit configured to output a position command for causing a rotor position of a motor to follow a reference position;
a position control unit configured to perform control such that the rotor position of the motor and the position command coincide with each other and output a motor rotor speed command; and
a torque-limit output unit configured to output a torque limit value that is an allowable torque of the motor,
wherein the torque-limit output unit outputs, according to rotor speed of the motor, the torque limit value with which power consumption required for driving of the motor is equal to or smaller than a predetermined motor power limit value and voltage amplitude required for the driving of the motor is equal to or smaller than a predetermined motor voltage limit value, and
wherein the position-command generating unit includes a motor model simulating a machine motion of the motor, performs a constant speed motion in the motor model or performs acceleration operation, or deceleration operation at torque equal to or smaller than the torque limit value to obtain motor model speed, and integrates the obtained motor model speed to generate a motor model position as the position command.

2. A motor control apparatus comprising:
a speed-command generating unit configured to output a speed command for causing rotor speed of a motor to follow reference speed;
a speed control unit configured to perform control such that the rotor speed of the motor and the speed command coincide with each other and output a motor torque command; and
a torque-limit output unit configured to output a torque limit value that is an allowable torque of the motor,
wherein according to the rotor speed of the motor, the torque-limit output unit outputs the torque limit value with which power consumption of the motor is equal to or smaller than a predetermined motor power limit value and voltage amplitude required for driving the motor is equal to or smaller than a predetermined motor voltage limit value, and
wherein the speed-command generating unit includes a motor model simulating a machine motion of the motor, performs a constant speed motion in the motor model, or performs acceleration operation or deceleration operation at torque equal to or smaller than the torque limit value to generate motor model speed as the speed command.

3. A motor control apparatus that divides an electric current of a motor into an excitation current component and a torque current component, which are components on a two-axis orthogonal rotation coordinate, and handles the electric current, the motor control apparatus comprising:
a power/voltage limiting unit including:
a power calculating unit configured to calculate power consumption of the motor;
a power limiting unit configured to limit the motor power consumption calculated by the power calculating unit to a value equal to or smaller than a power limit value that is an upper limit value of power consumption of the motor corresponding to a power supply capacity of a power supply device which performs power supply to the motor control apparatus;

a torque-divided-voltage-limit-value calculating unit configured to calculate a torque divided voltage limit value of the motor; and a voltage limiting unit configured to limit a driving voltage of the motor to a value equal to or smaller than a predetermined motor voltage limit value, wherein the power limiting unit corrects a motor torque current according to an excess amount of the motor power consumption with respect to the power limit value, wherein the torque-divided-voltage-limit-value calculating unit calculates the torque divided voltage limit value of the motor on the basis of the motor voltage limit value and an excitation divided voltage of the motor, and wherein the voltage limiting unit corrects a motor excitation current according to the excess amount of a motor torque divided voltage with respect to the torque divided voltage limit value of the motor calculated by the torque-divided-voltage-limit-value calculating unit.

4. A motor control apparatus that divides an electric current of a motor into an excitation current component and a torque current component, which are components on a two-axis orthogonal rotation coordinate, and handles the electric current, the motor control apparatus comprising:

a torque-limit output unit including a motor model unit and a model-power/model-voltage limiting unit and configured to output a torque limit value, which is allowable torque of the motor, according to motor rotor speed, wherein the model-power/model-voltage limiting unit includes a motor-model-power calculating unit configured to calculate motor model power consumption, a motor-model-power limiting unit configured to limit the motor model power consumption calculated by the motor-model-power calculating unit to a value equal to or smaller than a predetermined motor power limit value, a motor-model-torque-divided-voltage-limit-value calculating unit configured to calculate a torque divided voltage limit value of a motor model, and a motor-model-voltage limiting unit configured to limit a motor model driving voltage to a value equal to or smaller than a predetermined motor voltage limit value, wherein the motor-model-power limiting unit corrects a motor model torque current according to an excess amount of the motor model power consumption with respect to the motor power limit value, wherein the motor-model-torque-divided-voltage-limit-value calculating unit calculates a torque divided voltage limit value of the motor model on the basis of the motor voltage limit value and an excitation divided voltage of the motor model, wherein the motor-model-voltage limiting unit carries out, at each motor rotating speed, processing for correcting a motor model excitation current according to an excess amount of the motor model torque divided voltage with respect to the motor model torque divided voltage limit value, calculates torque of the motor model on the basis of a torque current of the motor model and an excitation current of the motor model obtained by the correction processing, and outputs the calculated torque of the motor model as a torque limit value, and wherein the motor control apparatus generates a command to limit torque of the motor to a value equal to or smaller than the torque limit value.

5. The motor control apparatus according to claim 1, further comprising a parameter storing unit configured to retain the motor power limit value and the motor voltage limit value as control parameters that can be changed as appropriate.

6. The motor control apparatus according to claim 1, further comprising a communication unit configured to acquire the motor power limit value and the motor voltage limit value through communication with a host control apparatus.

7. The motor control apparatus according to claim 1, further comprising a communication unit configured to notify a host control apparatus through communication of a reaching estimated time to the reference position or the reference speed.

8. The motor control apparatus according to claim 2, further comprising a parameter storing unit configured to retain the motor power limit value and the motor voltage limit value as control parameters that can be changed as appropriate.

9. The motor control apparatus according to claim 2, further comprising a communication unit configured to acquire the motor power limit value and the motor voltage limit value through communication with a host control apparatus.

10. The motor control apparatus according to claim 2, further comprising a communication unit configured to notify a host control apparatus through communication of a reaching estimated time to the reference position or the reference speed.

11. The motor control apparatus according to claim 4, wherein the torque-limit output unit includes a torque table configured to store a torque limit value corresponding to motor rotating speed, describes a torque limit value obtained by carrying out processing by the motor model and the model-power/model-voltage limiting unit in the torque table before start of operation of the motor, or at timing when the motor power limit value is changed or when the voltage limit value is changed, and outputs the torque limit value described in the torque table according to motor rotor speed during the motor operation.

12. The motor control apparatus according to claim 11, wherein the torque table of the torque-limit output unit stores a torque limit value that is set such that torque build-up at start of acceleration or torque build-down at start of deceleration are carried out at a predetermined time constant.

* * * * *